United States Patent

[11] 3,612,278

| [72] | Inventor | Melvin L. Dieterich<br>North Olmsted, Ohio |
|---|---|---|
| [21] | Appl. No. | 873,251 |
| [22] | Filed | Nov. 3, 1969 |
| [45] | Patented | Oct. 12, 1971 |
| [73] | Assignee | The Standard Products Company<br>Cleveland, Ohio |

[54] WASTE TREATMENT AND DISPOSAL SYSTEM
1 Claim, 5 Drawing Figs.

[52] U.S. Cl.............................................. 210/152,
210/177, 210/180, 210/181, 210/198, 210/416,
417/476, 418/15, 418/45
[51] Int. Cl....................................................... B01d 1/14,
C02b 1/18
[50] Field of Search........................................... 210/152,
177, 180, 181, 198, 416; 418/45, 15; 417/476, 477

[56] References Cited
UNITED STATES PATENTS

| 2,987,004 | 6/1961 | Murray.......................... | 417/477 X |
| 3,342,337 | 9/1967 | Reid.............................. | 210/152 |

*Primary Examiner*—Samih N. Zaharna
*Assistant Examiner*—Frederick F. Calvetti
*Attorney*—Meyer, Tilberry and Body ABSTRACT: A fluid treatment system in which a peristaltic pump employs concentric tubes to define separate flow paths for the treating agent and the material to be treated. In this manner, a single pump may be used to pump both fluids. The flow paths may merge either interior or exterior of the pump whereby a metered amount of treating agent is mixed with the fluid. A specific application is in waste disposal system in which deodorants or antifoaming agents are added to the waste products prior to final disposal.

INVENTOR.
MELVIN L. DIETERICH
BY
Meyer Tilberry & Body
ATTORNEYS

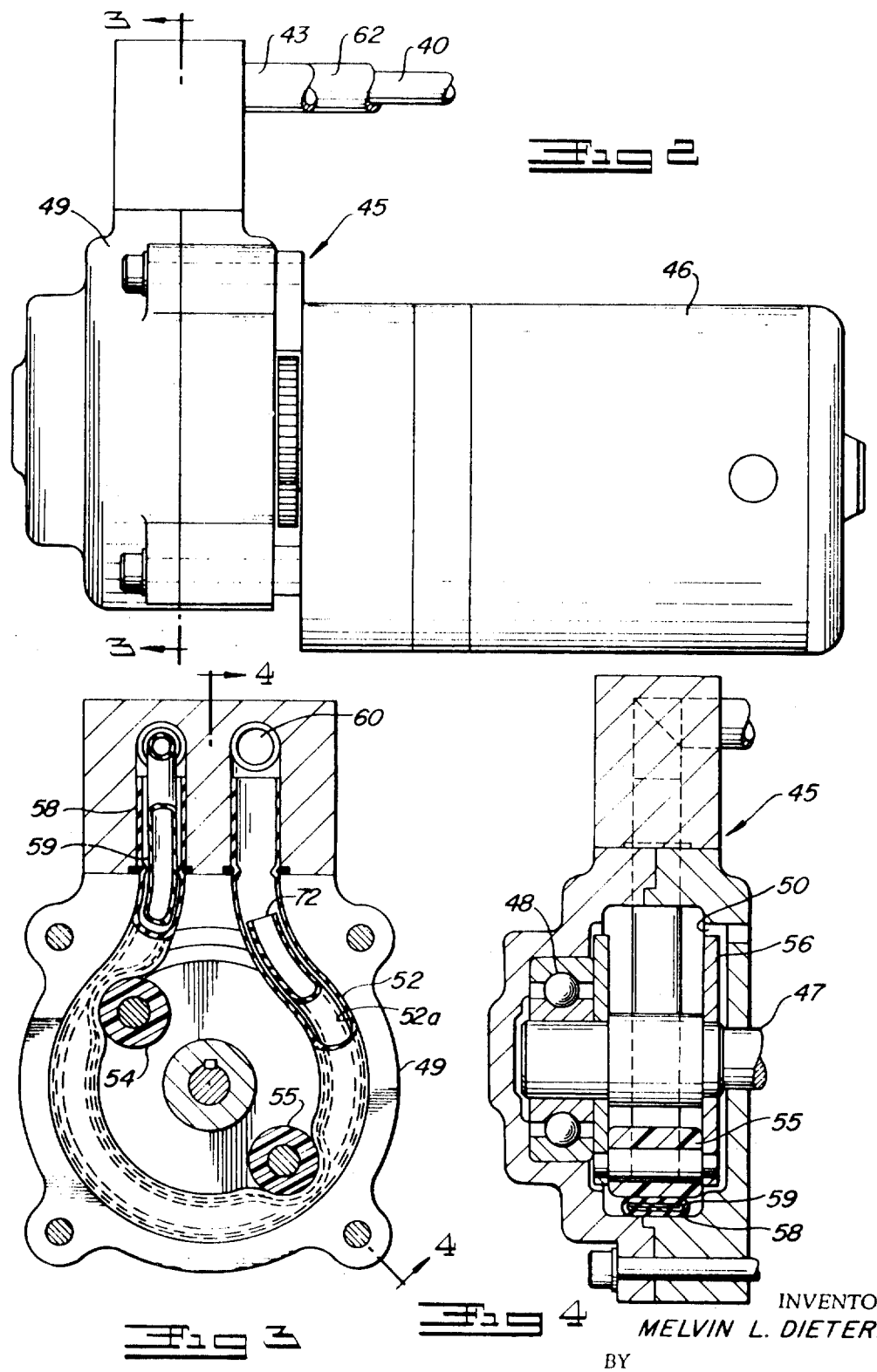

WASTE TREATMENT AND DISPOSAL SYSTEM

This invention relates to the filed of waste treatment and disposal systems and, more particularly, to a water treatment system especially designed for use in vehicular units for the disposal of human waste and/or other like disposable waste products.

Although the invention will be described with particular reference to a waste disposal system having utility in vehicular units such as buses, trucks, mobile homes, boats, and other types of vehicles utilized for human transportation, it is to be understood that the principles of the invention have broader application and may be employed in any system in which two or more fluids are to be transmitted and intermixed. Moreover, it will be appreciated that within the specific field of waste disposal systems, the instant system may find utility in stationary installations where a conventional sewage system such as is presently in use in most large municipalities is not available.

There is disclosed in U.S. Pat. No. 3,342,337, assigned to the assignee herein, am improved waste disposal system particularly adapted for use in vehicular units and the like. This system contemplates the use of the waste-heated gases generated by the prime mover of the vehicle as the means for vaporizing the effluent from a septic tank or other source of liquid waste products. In the particular embodiment shown in that patent, a pump withdraws liquid from the septic tank and transmits it to a dissipatus drum wherein the effluent is vaporized by the hot exhaust gases from the engine. The vaporized effluent may then be discharged either into the exhaust system or directly into the atmosphere.

It is a primary object of this invention to provide an improved hydraulic transmission system for use in a waste disposal system of the aforementioned description and, more particularly, to provide an improved pump for transmitting the septic tank effluent to the vaporization chamber.

In accordance with the principal aspect of the invention, there is provided a waste disposal system which incorporates a peristaltic pump for transmitting the liquid effluent from the septic tank to the vaporization chamber. The peristaltic pump employs tubular means, preferably concentric tubes, which define two or more separate flow paths for two or more different liquids. In accordance with one form of the invention, the concentric tubes merge into a single tube downstream of the pumping chamber whereby liquids may be intermixed in measured quantities. With this arrangement, chemical agents or other treating liquids such as antifoaming agents or deodorants may be introduced and intermixed with the liquid effluent prior to the introduction of the liquid to the vaporization chamber. Alternatively the concentric tubes may remain separate with the liquids thereby being maintained separate until the liquids are introduced to the vaporization chamber.

Referring now to the drawings, wherein like reference numerals indicate like parts in the various views:

FIG. 3 is a sectional view along lines 3—3 of FIG. 2;

FIG. 4 is a sectional view along lines 4—4 of FIG. 3;

FIG. 5 is a sectional view along lines 5—5 of FIG. 1.

Figure 1:
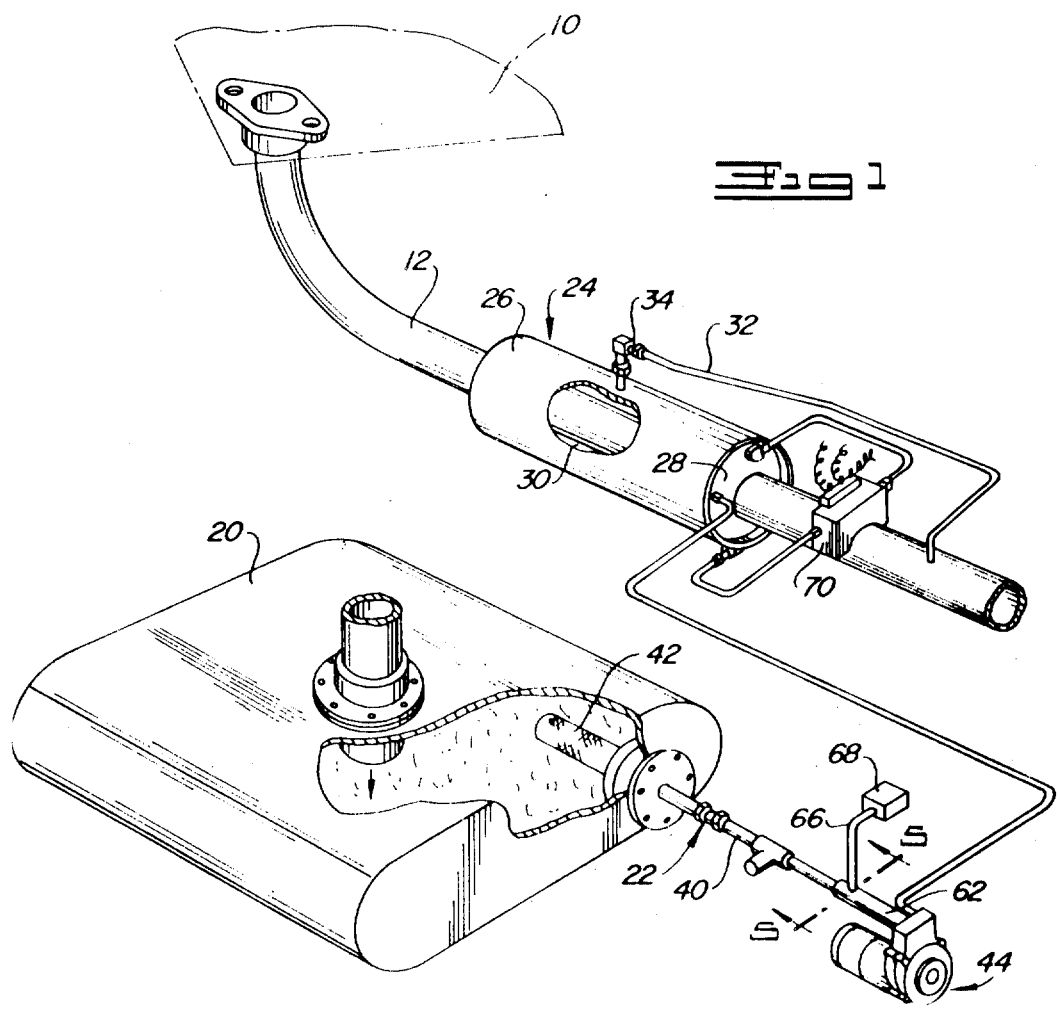
FIG. 1 is a schematic perspective view of a waste disposal system employing the principles of the instant invention.

Referring now more in detail to the system of FIG. 1, the present invention is illustrated as adapted for use with a vehicular unit such as a bus, boat or the like and which includes a source of motive power such as a gasoline engine, schematically illustrated at 10. As is well known, the engine will include the conventional exhaust system for discharging the by products of combustion from the engine to the atmosphere with the exhaust system including an exhaust conduit 12 connected at one end to the exhaust manifold of the engine 10 and at its other end to a muffler and tailpipe assembly, not shown.

It is obvious that the hot exhaust gases emerge from the engine 10 and pass through the exhaust conduit to the atmosphere. It is these hot exhaust gases passing through the exhaust system which, as taught by the aforementioned patent, are utilized to vaporize the liquid waste products.

The waste products may be vaporized in any of a number of different ways. As shown in FIG. 1, the waste material is extracted from a waste tank 20 which is designed to receive the waste products. The tank 20 is connected through an appropriate outlet conduit assembly indicated generally by the reference numeral 22, to a dissipatus apparatus, indicated generally by the reference numeral 24. As shown, the dissipatus apparatus comprises a cylindrical drum 26 which is received over and surrounds a section of the exhaust conduit 12 with the conduit passing through openings in the end walls 28 of the drum. The end walls may be rigidly secured to the conduit by welding or the like to define a closed annular interior vaporization chamber 30. A dissipatus tube 32 is connected at one end to a tap 34 in communication with the interior 30 of the drum 24 while the other end of the tube 32 is connected to the exhaust conduit 12 at a point downstream from the drum 26.

The structure heretofore described comprises, in large part, the system illustrated in the aforementioned patent and functions in the following manner. Waste material is deposited in the waste tank 20 where bacteriological action may occur, if required, to convert the solid particles of the waste into a partially purified fluid solution. When it is desired to dispose of the liquid material in the tank 20, fluid is withdrawn through the outlet conduit assembly 22 and transported through that assembly to the vaporization chamber 30 in the dissipatus drum 26. With the engine running and hot exhaust gases passing through the exhaust conduit 12, it is readily apparent that the temperature in the vaporization chamber 30 is raised to an elevated level whereby any liquid therein is boiled and substantially vaporized. The vapors thereafter pass out of the drum 26 through the tap 34, the tube 32 and into the exhaust conduit 12 where they are mixed with the exhaust gases and dissipated into the atmosphere. Since the fluid in the dissipatus apparatus is vaporized, it is purified so that the resultant vapors or condensed liquid which are discharged into the atmosphere through the exhaust conduit 12 do not create any health hazards.

Referring now more in detail to the outlet conduit assembly 22 and the means for transferring the liquid from the waste tank 20 to the dissipatus drum 26, there is illustrated an outlet conduit 40 which is connected at one end by a suitable filter 42 to the interior of the tank 20 while the other end of the conduit is connected to a pump assembly 44. A conduit 43 leads from the pump to the vaporization chamber 30.

Figure 2:
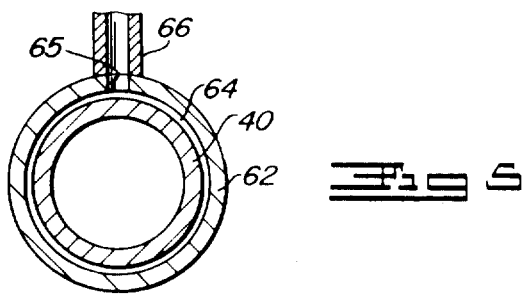
FIG. 2 is a side elevation view of the pump employed in the system of FIG. 1.

The pump assembly 44 is illustrated in more detail in FIGS. 2, 3 and 4 to which reference may now be had. As shown in those figures, the pump assembly includes an electric motor 46 which is drivingly connected by appropriate means to the shaft 47 of a peristaltic pump 45. The shaft 47 is rotatably supported at its outer extremity by a bearing 48 in the pump housing 49. The pump housing further includes a pumping chamber 50 in the interior thereof. Received in the pumping chamber 50 is a fluid conducting, deformable tubular assembly, indicated generally by the reference numeral 52. The tubular assembly 52 is received in a groove 50*a* extending generally circumferentially of the chamber 50 with the tube thus forming a loop from the inlet to the outlet of the pump.

The pump assembly includes a pair of compression rollers 54, 55 which are carried by roller arms 56 secured to the shaft 47 and adapted to rotate with shaft 47. As illustrated in FIG. 3, the rollers 54,55 are diametrically spaced from each other. With this arrangement it will be appreciated that the rollers engage the tubular assembly causing the tube to be collapsed by compression progressively along its length thereby forcing ahead of the area of compression a quantity of liquid which ultimately passes out of the pump chamber 50. The return of the tubing to its uncompressed state creates a vacuum which causes fluid to flow from the source into the tubular assembly.

The tubular assembly 52 differs from that used in the conventional prior art peristaltic pumps in that a pair of concentric tubular conduits are received one within the other. Thus, there is provided an outer tubular conduit 58 and an inner tubular conduit 59 with the two conduits extending through the looped pumping chamber 50. As shown in FIG. 3, the inner tubular conduit 59 terminates immediately after the looped pumping chamber with the outer conduit 58 being connected to an outlet passage 60 in the pump housing 49. The dimensions of the two tubes 58,59 and the relationship of the tubes to the rollers 54,55 is such that, as the rollers rotate through their pumping sequence, the two tubes are collapsed and thus comprise two separate regions in which fluids may be progressively forced through the pump to the outlet 60.

In accordance with the principles of this invention, it is contemplated that the two tubes 58,59 will be connected to different sources of liquid. Thus, one of the tubes, for example the inner tube 59, is connected to the conduit 40 and is adapted to serve as a conduit for the liquid waste material withdrawn from the waste tank 20. The outer tube 58 is connected to a second source of liquid in the manner illustrated in FIGS. 1 and 2. Thus, a sleeve 62 is received over the conduit 40 adjacent to the pump assembly 44. The sleeve 62 cooperates with the exterior of the conduit 40 to define an interior space 64 therebetween. The sleeve 62 further includes an aperture 65 which is in communication with a conduit 66 connected to a second source of liquid 68. It will be appreciated that the liquid thus supplied from the source 68 passes through the conduit 66, the aperture 65 into the annular space 64 and thence into the outer tube 58 where, as the tube 58 is compressed by the rollers 54,55, the liquid is forced through the pump to the outlet 60.

The pump arrangement thus described may be used for a variety of purposes and, in particular, lends itself to considerable flexibility in the treatment of waste materials. For example, it is well known that when boiling a liquid containing a high concentration of urine, substantial foaming results. To alleviate this condition, the source 68 may be used to supply an antifoaming emulsion to the liquid waste as it is transferred from the waste tank to the dissipatus drum 30. Another example would be to use the source 68 as a source of a deodorant which, for aesthetic reasons, would be mixed with the liquid waste material prior to vaporization and discharge to the atmosphere. As a still further alternative, a chemical additive such as a chlorine solution may be added to assist in killing bacteria.

Irrespective of the specific treating agent introduced from the source 68, the described apparatus functions in the following manner. When it is desired to dispose of liquid waste material from the tank 20, the motor 46 is actuated by appropriate means such as a thermostatic block 70. With actuation of the motor, the shaft 47 and its associated rollers 54,55 are caused to rotate. As the rollers 54,55 rotate in the chamber 50, they compress the two tubes 58,59 to the point where the tubes are completely collapsed and in intimate contact with each other. As shown in FIG. 3, the uncompressed space or region in the tubes between the rollers 54,55 thus comprises a region in which any fluid contained in either of the tubes 58,59 is trapped and caused progressively to move along the tubes toward the pump outlet.

As viewed in FIG. 3, and assuming a counterclockwise rotation of the shaft 47, this would occur when the roller 55 has rotated to a position where it disengages from the right hand loop of the tubular assembly. In this condition and assuming continued rotation of the motor, the roller 54 would then force all the liquid in the two tubes 58,59 on through the loop until such time as the roller 54 also passes out of engagement with the tubes. In the meantime, the roller 55 will have progressed to a point where it has reengaged the tubes and forces ahead of it another quantity of liquid.

It will be appreciated that the two tubes define separate fluid chambers which maintain the liquid in each tube separate from the liquid in the other. Moreover, as is typical with peristaltic pumps, the amount of liquid trapped between the two rollers 54,55 remains essentially constant with each cycle of operation of the pump thereby providing a means whereby a relatively accurately metered amount of each liquid is passed through the pump with each cycle of operation. Still further, the complete collapse of the tubes under the compressive action of the rollers effectively isolates the source of liquid from any back pressure that may develop in the boiler chamber.

The two liquids in the tubes 58,59 may be maintained separate or intermixed, depending on the specific fluids involved and the specific application. As shown in FIG. 3, the inner tube 59 terminates at a point 72 prior to the outlet passage 60 with the liquid contained in the two tubes thus being intermixed as the liquids emerge from the pump. It is to be understood that the principles of this invention also contemplate maintaining the two liquids separate as they emerge from the pump as well.

Several advantages of the described system should be noted. Thus, the pump provides a relatively inexpensive means of accurately metering and mixing two or more fluids in a liquid treatment system. Moreover, the pump itself functions as a control valve in that, when the pump is not operating, the collapsed condition of the tubes prevent the flow of any liquid through the system. Moreover, the fact that one of the rollers 54,55 is always in engagement with the tubes isolates any back pressure from the source of liquid waste. Still further, the ratio of the fluids which may be mixed may be adjusted simply by varying the tube sizes.

Although the invention has been disclosed in combination with a waste disposal system in which the liquid waste is vaporized, it should be apparent that the same pump and method of treatment may be employed for other methods of waste disposal. For example, it may be desired simply to withdraw waste material from a holding tank and dispose of it by incineration. The same pump arrangement as shown herein may be used. Moreover, the presence of sludge in the waste material will have no effect on the pump since the compressible tubing will readily handle both the waste material and such other liquid as may be supplied from source 68.

The pump and tube assembly may also find utility in the following applications. It may be desired to dispose of waste only by chemical treatment. With each operation of the pump, a quantity of waste material will be passed through the pump while, simultaneously, a quantity of chemicals may be added in a measured amount to the material. As a further alternative, it may be desirable merely to store the waste material pending final disposal at a later time. The chemicals, such as antifreeze, may be added to the waste as it is transferred to the place of storage.

Having thus described my invention, I claim:
1. In combination; a waste disposal system including a waste tank for receiving liquid and organic waste material, a heat source separate from said waste tank for vaporizing said waste material, a supply source of treating agent material for said waste material, a supply source of treating agent material for said waste material, pump means for supplying waste material from said waste tank to said heat source and for supplying treating agent material from said supply source to said heat source, said pump means comprising a peristaltic pump having a pair of concentric inner and outer tubes, said inner tube having an outer diameter and said outer tube having an inner diameter, said outer diameter of said inner tube being substantially smaller than said inner diameter of said outer tube, each of said inner and outer tubes having an inlet end and an outlet end, said inlet end of one of said tubes being connected with said waste tank and said inlet end of the other of said tubes being connected with said supply source of treating agent material, said outlet end of said inner tube terminating short of said outlet end of said outer tube, and said outlet end of said outer tube being connected with said heat source for supplying waste material and treating agent material to said heat source, whereby operation of said pump simultaneously draws waste material from said waste tank and treating agent material from said supply source for intermixture and simultaneous discharge through said outlet end of said outer tube to said heat source.